(12) United States Patent
Marche

(10) Patent No.: US 8,226,028 B2
(45) Date of Patent: Jul. 24, 2012

(54) DEVICE FOR MOUNTING AN AIRCRAFT TURBOPROP ENGINE COMPRISING HYDRAULIC ATTACHMENTS

(75) Inventor: Herve Marche, Toulouse (FR)

(73) Assignee: Airbus Operations (Societe par Actions Simplifiee), Toulouse (FR)

( * ) Notice: Subject to any disclaimer, the term of this patent is extended or adjusted under 35 U.S.C. 154(b) by 327 days.

(21) Appl. No.: 12/602,110

(22) PCT Filed: Jun. 2, 2008

(86) PCT No.: PCT/EP2008/056742
§ 371 (c)(1),
(2), (4) Date: Nov. 27, 2009

(87) PCT Pub. No.: WO2008/148722
PCT Pub. Date: Dec. 11, 2008

(65) Prior Publication Data
US 2010/0176239 A1 Jul. 15, 2010

(30) Foreign Application Priority Data
Jun. 4, 2007 (FR) .................................. 07 55449

(51) Int. Cl.
*F02C 7/20* (2006.01)
(52) U.S. Cl. .............................. 244/54; 60/796; 248/557
(58) Field of Classification Search .................... 244/54, 244/55; 60/796, 797; 248/554–557
See application file for complete search history.

(56) References Cited

U.S. PATENT DOCUMENTS

| | | | | |
|---|---|---|---|---|
| 2,145,280 A * | 1/1939 | Stitz | | 248/556 |
| RE21,328 E * | 1/1940 | Stitz | | 248/556 |
| 2,261,954 A * | 11/1941 | Browne | | 248/556 |
| 2,465,790 A * | 3/1949 | Campbell | | 248/556 |
| 2,934,332 A * | 4/1960 | Mercier | | 267/226 |
| 4,720,060 A * | 1/1988 | Yana | | 244/17.27 |
| 5,065,959 A * | 11/1991 | Bhatia et al. | | 244/54 |
| 5,197,692 A * | 3/1993 | Jones et al. | | 244/54 |
| 5,372,338 A | 12/1994 | Carlin et al. | | |
| 5,495,923 A * | 3/1996 | Bruski et al. | | 188/268 |
| 5,746,391 A * | 5/1998 | Rodgers et al. | | 244/54 |
| 5,918,833 A * | 7/1999 | Najand et al. | | 244/54 |
| 6,422,545 B1 * | 7/2002 | Baudendistel et al. | | 267/140.13 |
| 6,708,925 B2 * | 3/2004 | Udall | | 244/54 |
| 6,935,591 B2 * | 8/2005 | Udall | | 244/54 |

(Continued)

FOREIGN PATENT DOCUMENTS

EP          0 855 536          7/1998

(Continued)

*Primary Examiner* — Timothy D Collins
*Assistant Examiner* — Steven Hawk
(74) *Attorney, Agent, or Firm* — Oblon, Spivak, McClelland, Maier & Neustadt, L.L.P.

(57) ABSTRACT

An engine unit for an aircraft including a turboprop engine and its device for mounting on to a wing surface. The device includes a rigid structure and a mechanism for fastening the turboprop engine on to this structure. The fastening mechanism includes six mutually independent hydraulic systems, each one exclusively dedicated to the transfer, to the rigid structure, of forces exerted respectively according to one of the six degrees of freedom of movement. Each hydraulic system includes at least one hydraulic jack with a piston attached to one of the two elements, i.e. either the turboprop engine or the rigid structure, together with a cylinder housing the piston and attached to the other of the two elements.

13 Claims, 9 Drawing Sheets

U.S. PATENT DOCUMENTS

| | | | |
|---|---|---|---|
| 7,063,290 B2 * | 6/2006 | Marche | 244/54 |
| 7,232,091 B2 * | 6/2007 | Marche | 244/54 |
| 7,296,768 B2 * | 11/2007 | Machado et al. | 244/54 |
| 2004/0227033 A1 * | 11/2004 | Picard et al. | 244/54 |
| 2005/0081531 A1 * | 4/2005 | Stretton et al. | 60/797 |
| 2005/0116093 A1 * | 6/2005 | Machado et al. | 244/54 |
| 2009/0026671 A1 * | 1/2009 | Kojima et al. | 267/121 |
| 2010/0132378 A1 * | 6/2010 | Marche | 60/797 |

FOREIGN PATENT DOCUMENTS

| | | |
|---|---|---|
| GB | 2 266 080 | 10/1993 |
| GB | 2 407 134 | 4/2005 |

* cited by examiner

_US 8,226,028 B2_

DEVICE FOR MOUNTING AN AIRCRAFT TURBOPROP ENGINE COMPRISING HYDRAULIC ATTACHMENTS

TECHNICAL FIELD

The present invention relates generally to a device able to mount a turboprop engine under an aircraft wing surface, or again above this same wing surface.

Such a device may be used on any type of aircraft having turboprop suspended engines or engines mounted above its wing surface, such as turboprop engines able to supply a very high level of power, possibly exceeding 10,000 horsepower.

STATE OF THE PRIOR ART

In existing aircraft the engines are suspended beneath or mounted above the wing surface by complex mounting systems, also called "EMS" ("Engine Mounting Structure"), in order jointly to form an assembly called an engine unit.

These devices are designed notably to allow transmission to the wing surface of the static and dynamic efforts produced by the engines, such as the weight, the thrust or again the various dynamic efforts. All references hereinafter to efforts shall be understood and considered to include reference to forces.

In the prior art, in order to suspend a turboprop engine under an aircraft wing surface, a mounting device is traditionally provided comprising a rigid structure with a rear underwing caisson, together with one or more forward rigid segments positioned successively at the front in the longitudinal direction of the engine.

In this configuration, each forward rigid segment comprises for example two transverse frames spaced relative to one another, and linked together by means of a number of connecting rods and/or beams/caissons, as is shown in documents EP 1 538 080 B1 and U.S. Pat. No. 7,159,819 B1.

In a known manner, the mounting device comprises means for attaching the turboprop engine on to the rigid structure, where these means habitually take the form of a number of what are called flexible attachments, notably enabling the vibrations caused by the propeller of the turboprop engine to be filtered/dampened. These attachments are generally distributed over a forward frame and over a rear frame, where the latter can be attached under the under-wing caisson. Four such are, for example, distributed on the forward frame, and two such on the rear frame.

Each of these flexible attachments transmits efforts in at least two preferential directions, with relative flexibility, to the rigid structure. Consequently, the constructed assembly is totally hyperstatic, such that the efforts at the interfaces depend on the relative flexibility of the engine, the structure and the attachments, the manufacturing tolerances and the thermal differential distortions, making it extremely complex to determine them. In addition, the hyperstatic nature of these attachment devices may lead to assembly difficulties, and also lead to the appearance of substantial mechanical stresses.

SUMMARY OF THE INVENTION

The purpose of the invention is therefore to provide an engine unit for an aircraft at least partially providing a solution to the disadvantages mentioned above, compared with the embodiments of the prior art.

To accomplish this, the object of the invention is an engine unit for an aircraft comprising a turboprop engine together with a device for mounting the said turboprop engine on a wing surface of the aircraft, where the said mounting device comprises a rigid structure and means for fastening the said turboprop engine on to the said rigid structure. According to the invention the said fasteners comprise six mutually independent hydraulic systems, each one exclusively dedicated to the transfer, to the said rigid structure, of the efforts exerted respectively according to one of the six degrees of freedom of movement associated with the said turboprop engine, where each hydraulic system comprises at least one hydraulic jack with a piston attached to one of the two elements i.e. either the turboprop engine or the rigid structure of the mounting device, together with a cylinder housing the said piston and attached to the other of these same two elements.

Consequently, the invention provides an original solution enabling an isostatic assembly of the turboprop engine on the rigid structure of the mounting device, given that each of the hydraulic systems is indeed dedicated to providing one of the six degrees of freedom of movement associated with the turboprop engine, i.e. the three degrees of translation and the three degrees of rotation.

With this isostatic character of the assembly, the determination of the efforts at the interfaces is facilitated, and the assembly considerably simplified, since it is free of mechanical stresses.

It is stipulated that these independent hydraulic systems are preferably closed systems, and passive in that they are not controlled by any actuating devices, but on the contrary only react to the relative movements of the turboprop engine.

Preferably, at least one of the said six hydraulic systems, and still more preferably each of them, comprises at least two jacks connected hydraulically and each having a piston attached to one of the elements i.e. either the turboprop engine or the rigid structure of the mounting device, together with a cylinder housing the said piston and attached to the other of these same elements.

The fact of having several hydraulically connected jacks provides the possibility of distributing the efforts in a desired and predetermined manner on the rigid structure, for example on two transverse frames of this structure. Indeed, since the pressure found within the various jacks of a given system is identical due to their hydraulic connection, the distribution of the efforts transmitted by each of the jacks in a system is therefore a function of the diameters of the pistons, remembering that although these efforts vary according to the applied charge, their ratio remains constant.

As an indication, a distribution may be sought in which the majority of the efforts are exerted in a forward transverse plane of the rigid structure, and the other part in a rear transverse plane, in proportions which may, for example, be of the 80/20 type.

In addition, the fact that there are several hydraulically connected jacks greatly assists with the transmission of the efforts being exerted according to the degrees of freedom of rotation of the turboprop engine.

Preferably, at least one of the said six hydraulic systems, and even more preferably each of them, comprises a dampening system, to dampen the vibrations caused essentially by the propeller.

In such a case the dampening device then preferably comprises a fluid tank in which a body is housed which is capable of being compressed by the pressure of the fluid, where this tank is connected hydraulically to the different jacks in the system.

The said body is preferably made of rubber, or a similar material, able to be compressed by the pressurised fluid in the tank. The material is therefore preferably chosen according to the pressure levels of the fluid which can be found in the hydraulic system.

Also preferably, the said body has no mechanical link with the said fluid tank and, for example, takes the shape of a ball inserted in the said fluid tank, before it is closed.

As mentioned above, the said rigid structure comprises transverse frames, where each of the said hydraulic jacks is connected to one of the said transverse frames. In this configuration it is possible to have only two transverse frames supporting the said hydraulic jacks so as, for example, to obtain the distribution of the efforts indicated above.

Finally, another object of the invention is an aircraft comprising at least one engine unit as it has just been described.

Other advantages and characteristics of the invention will appear in the non-restrictive detailed disclosure below.

BRIEF DESCRIPTION OF THE DRAWINGS

This description will be made with reference to the attached illustrations, among which.

DETAILED DESCRIPTION OF PREFERRED EMBODIMENTS

Figure 1:
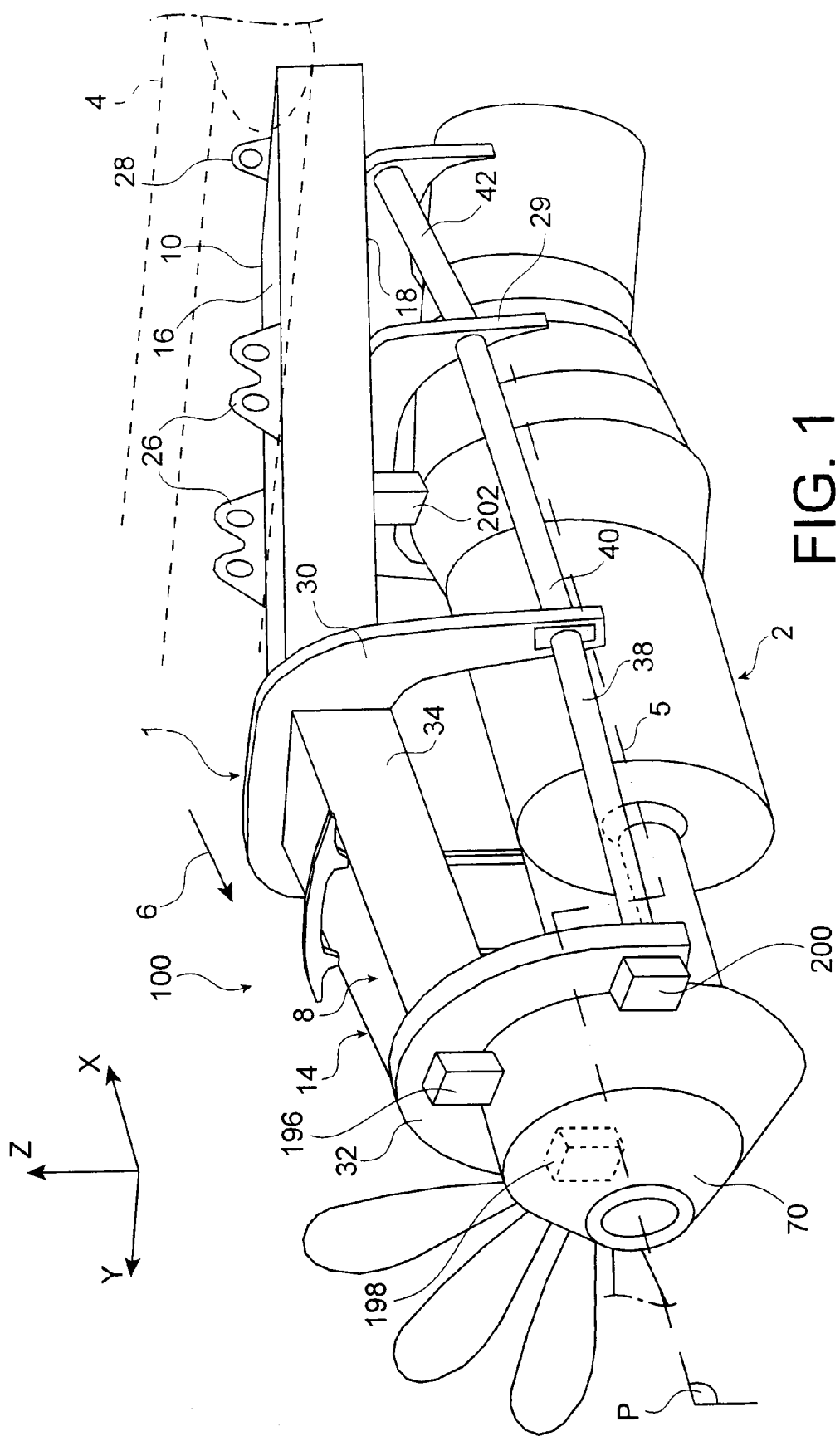
FIG. 1 represents a perspective view of an engine unit according to a preferred embodiment of the present invention, showing a turboprop engine and the rigid structure of a device for mounting this turboprop engine.

With reference to FIG. 1, an engine unit 100 for an aircraft according to a preferred embodiment of the present invention can be seen; this unit 100 globally comprises a turboprop engine 2, and also an engine mounting structure or device 1. Device 1 is here intended to provide the suspension of turboprop engine 2 under a wing of an aircraft represented only diagramatically for obvious reasons of clarity, and designated in a general manner by numerical reference 4.

Throughout the disclosure which will follow, by convention, X is the name given to the direction parallel to longitudinal axis 5 of the turboprop engine 2, also comparable to the longitudinal direction of structure 1 and of unit 100, Y is the direction oriented transversally relative to the aircraft and to turboprop 2, and also comparable to the transverse direction of structure 1 and of unit 100, and Z is the vertical direction, or direction of the height; these three directions are orthogonal one to the others. It is stipulated that longitudinal axis 5 of turboprop engine 2 must be understood as being the longitudinal axis of the engine housing, and not the longitudinal axis of its propulsive propeller (not referenced).

In addition, the terms "forward" and "rear" must be considered relative to the forward direction of the aircraft imparted due to the thrust exerted by the turboprop engines 2, and this direction is represented schematically by arrow 6.

In FIG. 1 it is possible to see that only a rigid structure 8 of mounting device 1 has been represented. The other unrepresented constituent elements of this device 1, of the secondary structure type providing segregation and maintenance of the systems, whilst supporting aerodynamic fairings, are traditional elements which are identical or similar to those found in the prior art, and known to the skilled man in the art. Consequently, no detailed disclosure will be made of them.

In this preferred embodiment of the present invention, rigid structure 8 comprises from the rear to the front, successively in longitudinal axis 5 of turboprop engine 2, a rear under-wing caisson, and a forward segment 14.

Rear under-wing caisson 10 is of the same type as those found in the devices for mounting turboprop engines of the prior art, and well known to the skilled man in the art.

As an illustration, this under-wing caisson can include an upper stringer 16 and a lower stringer 18, each extending roughly in the X direction, where these stringers 16 and 18 are connected to one another through a number of transverse internal ribs (not visible), which are spaced and positioned in YZ planes. Nevertheless, as this is represented in FIG. 1, it is possible to have stringers 16 and 18 located in planes which are slightly inclined relative to the XY planes.

In addition, under-wing caisson 10 has two lateral blanks which close it, where each of these two blanks may possibly be comprised of several flat and vertical blank elements.

In addition, as is clearly visible in FIG. 1, rear under-wing caisson 10 has two front attachments 26 intended to mount device 1 under wing 4 of the aircraft. For example, each attachment 26 takes the form of a bracket extending upwards in an XZ plane from upper stringer 16, in the area of a lateral end of the latter.

With this regard, there may also be a rear attachment 28 to provide the mounting of the device 1 under wing 4 jointly with the two front attachments 26; this attachment 28 then takes the form of a bracket extending upwards in a YZ plane from upper stringer 16, in the area of a rear end of the latter.

Below under-wing caisson 10, structure 8 comprises one or more transverse frames, oriented in YZ planes. In the represented embodiment there are two rear transverse frames, with the one located more forward, referenced 29, being intended to bear a part of the fasteners interposed between the turboprop engine and the rigid structure.

At the front, under-wing caisson 10 can be closed by a first front transverse frame 30 located in a YZ plane, where this frame preferably has the general shape of an inverted U, and also forms an integral part of front segment 14.

This front rigid segment 14 indeed comprises, in association with the first transverse frame 30, a second transverse frame 32 which is also located in a YZ plan and having the shape of an inverted U, with its two branches pointing downwards and located below its base. Naturally, this inverted U-shaped configuration has been adopted such that in a mounted state turboprop engine 2 can be connected between the two branches of each U.

In addition, this rigid segment 14 has an upper forward caisson 34 linking an upper part of the two transverse frames 30 and 32, and more specifically the two bases of the inverted "U"s formed respectively by these same frames 30 and 32. It should be noted that in this preferred embodiment, a single caisson 34 links the upper part of the two transverse frames 30 and 32. Nonetheless, without going beyond the scope of the invention, there could of course be several forward caissons to connect the upper parts of these two frames 30 and 32.

Upper forward caisson 34 has a design identical or similar to that of the under-wing caisson 10, as is visible in FIG. 1.

Still in this figure, it is possible to see that transverse frames 30 and 32 are not only linked by the upper forward caisson 34, but also through connecting rods 38; the number of latter is not in any circumstances restricted. These connecting rods 38 are positioned symmetrically relative to the vertical plane passing through longitudinal axis 5 of turboprop engine 2, where this plane P roughly constitutes a symmetry plane for structure 1 and unit 100.

Connecting rods 40 and 42, also forming part of rigid structure 8, also link frames 29 and 30, and also the rear transverse frames one to another.

In the same way as for rear transverse frame 29, forward transverse frame 32, constituting the forward end of the rigid structure, is also intended to be fitted with fasteners allowing the turboprop engine to be mounted on to the rigid structure. These fasteners, which are specific to the present invention and which will now be described in detail with reference to the following figures, are preferably only connected to these two frames 29 and 32, and therefore not to any other element of the rigid structure, in the aim of introducing the efforts into the structure, solely through these two forward and rear transverse planes.

Generally, the fasteners used, which are specific to the present invention, consist of six mutually independent hydraulic systems, each of them exclusively dedicated to the transfer, to the primary/rigid structure, of the efforts being exerted respectively in one of the six degrees of freedom of movement associated with the turboprop engine, i.e. the three degrees of translation below named Tx, Ty and Tz, and the three degrees of rotation below named Mx, My and Mz, where the index always corresponds to the direction in question. No element other than these six independent hydraulic systems participates in the fastening interface between the turboprop engine and the primary structure of the engine mounting structure.

In addition, in the preferred embodiment each hydraulic system comprises at least two jacks connected hydraulically and each having a piston attached to one of the elements i.e. either the turboprop engine or the rigid structure of the mounting device, together with the cylinder housing the piston and allowing it to slide, and attached to the other of these same elements.

Figure 2:
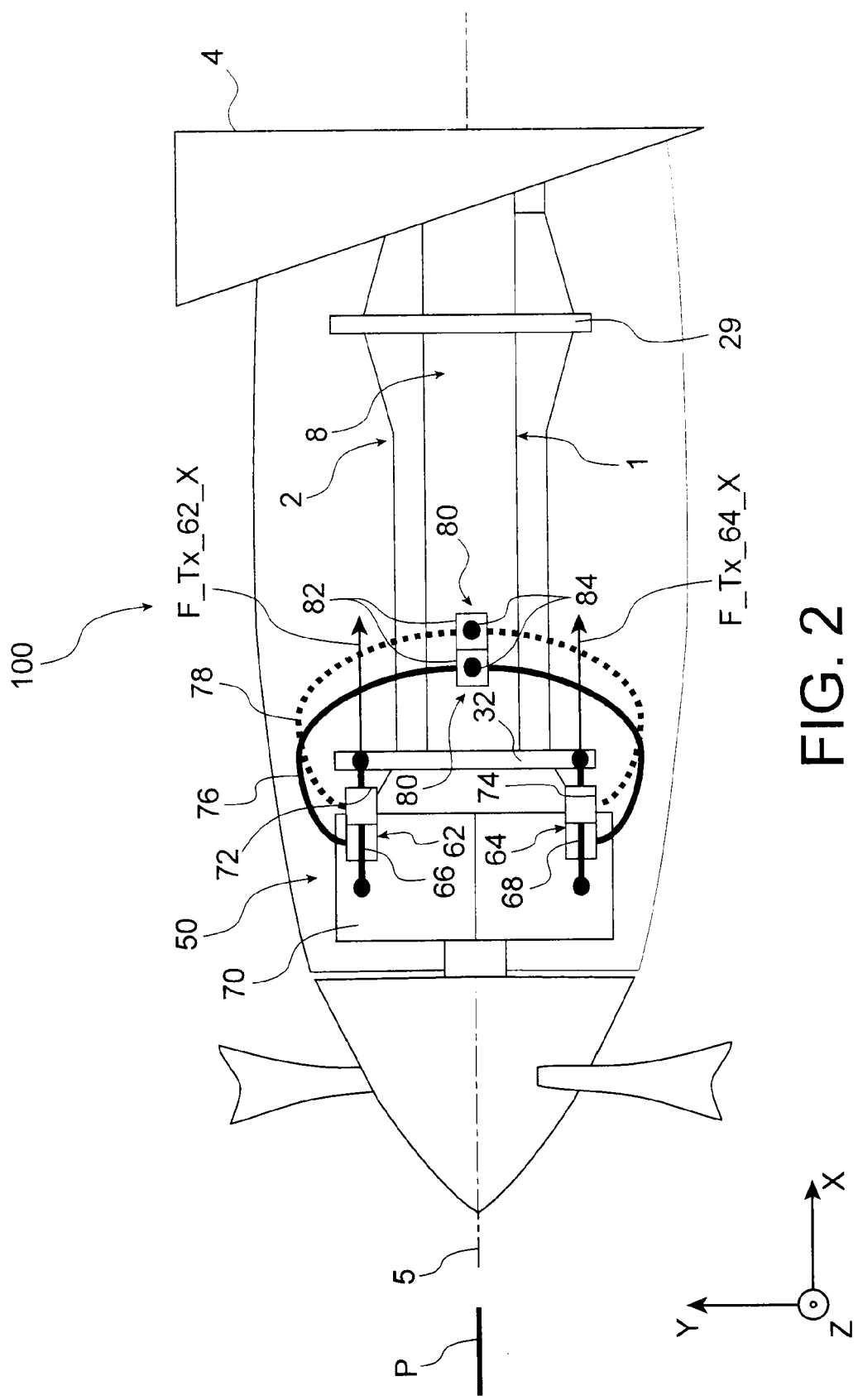
FIGS. 2 to 8 represent diagrammatic views showing the hydraulic devices for fastening the turboprop engine on to the rigid structure of the mounting device.

With reference to FIG. 2, it is possible to see diagramatically hydraulic system 50 forming an integral part of the abovementioned fasteners and dedicated to the transfer, from turboprop engine 2 to rigid structure 8, of the efforts being exerted in direction X or, in other words, being exerted with degree of freedom Tx.

System 50 comprises two hydraulic jacks 62, 64, preferably distributed symmetrically relative to vertical symmetry plane P of engine unit 100. Jacks 62, 64 respectively have a piston 66, 68 attached in fixed fashion to turboprop engine 2, in the area of the front part of the latter, and more specifically in the area of its main transmission 70, and also having a sliding cylinder 72, 74 housing piston 66, 68, and allowing it to slide, where this cylinder is attached in fixed fashion to forward frame 32.

For each of the jacks 62, 64, piston 66, 68 demarcates a forward chamber and a rear chamber, where both forward chambers are connected hydraulically to one another by means of a hydraulic line 76, and where both rear chambers are connected hydraulically to one another by means of another hydraulic line 78.

The orientation of pistons 66, 68 and their slide direction within the associated cylinder are aligned with direction X, such that each is capable of transferring efforts in this same direction.

The two efforts represented in FIG. 2 therefore correspond to the efforts transmitted by hydraulic system 50 to rigid structure 8, and are called F_Tx_62_X and F_Tx_64_X. Generally, all the efforts indicated in the description and in the figures are called as follows:

P_Dl_R_D where:
P takes the value "F" if the jack is located on forward frame 32, and takes the value "R" if the jack is located on rear frame 29;
Dl is the degree of freedom concerned;
R is the numerical reference of the jack concerned; and
D is the direction in which the effort is produced.

A hydraulic dampening device 80 is fitted to each line 76, 78, in order to dampen the vibrations of the turboprop engine which are likely in particular to be created by the propeller. It comprises a tank 82 filled with fluid and communicating either side with the hydraulic line concerned, together with a ball 84 made of rubber or a similar material introduced freely into this same tank, before the latter is closed.

Thus, in the case of vibrations of turboprop 2, the advantage of the compression of free ball 84 within the tank, caused by the pressurisation of the fluid, is that it causes this pressure to drop, from which a genuine dampening effect results.

Figure 3:
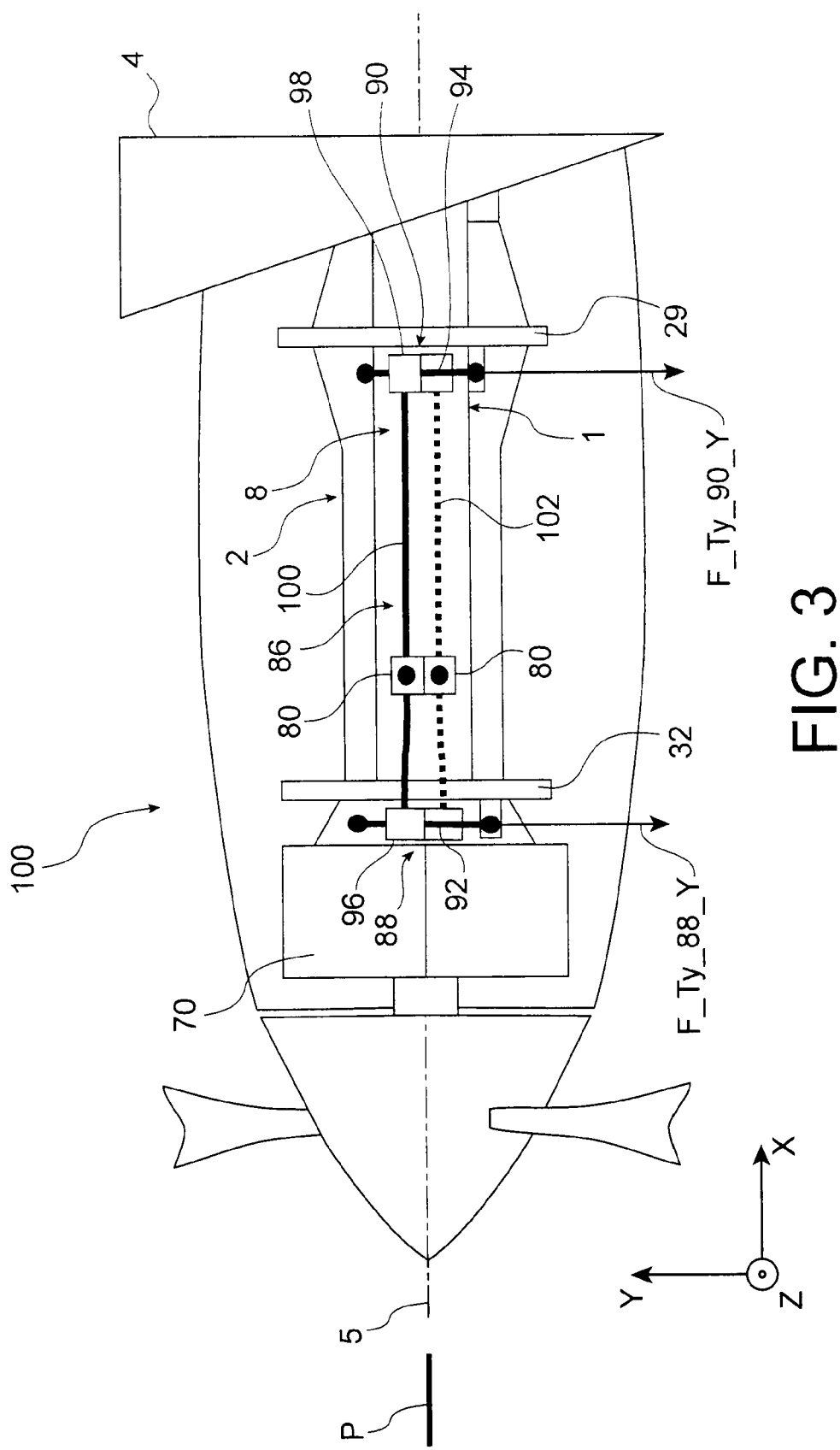

With reference to FIG. 3, it is possible to see diagramatically hydraulic system 86 forming an integral part of the fasteners and dedicated to the transfer, from turboprop engine 2 to rigid structure 8, of the efforts being exerted in direction Y or, in other words, being exerted with degree of freedom Ty.

System 86 comprises two hydraulic jacks 88, 90, preferably spaced longitudinally one from the other. Jacks 88, 90 have, respectively, a piston 92, 94 attached in fixed fashion on to the rigid structure, respectively in the area of frame 32 and of frame 29, and also have a slide cylinder 96, 98 housing piston 92, 94, and allowing it to slide, where this cylinder is attached in fixed fashion to the turboprop engine, and more specifically on to main transmission 70 in respect of cylinder 96.

For each of the jacks 88, 90, piston 92, 94 demarcates a right-hand chamber and a left-hand chamber, where both right-hand chambers are connected hydraulically to one another by means of a hydraulic line 100, and where both left-hand chambers are connected hydraulically to one another by means of another hydraulic line 102.

The orientation of pistons 92, 94 and their slide direction within the associated cylinder are aligned with direction Y, such that each is capable of transferring efforts in this same direction.

The two efforts represented in FIG. 3 thus correspond to the efforts transmitted by hydraulic system 86 to rigid structure 8, and are called F_Ty_88_Y and R_Ty_90_Y.

Here again, a hydraulic dampening device 80 similar to the one described above is fitted to each of the lines 100, 102, for the same purposes as those indicated above.

Figure 4:
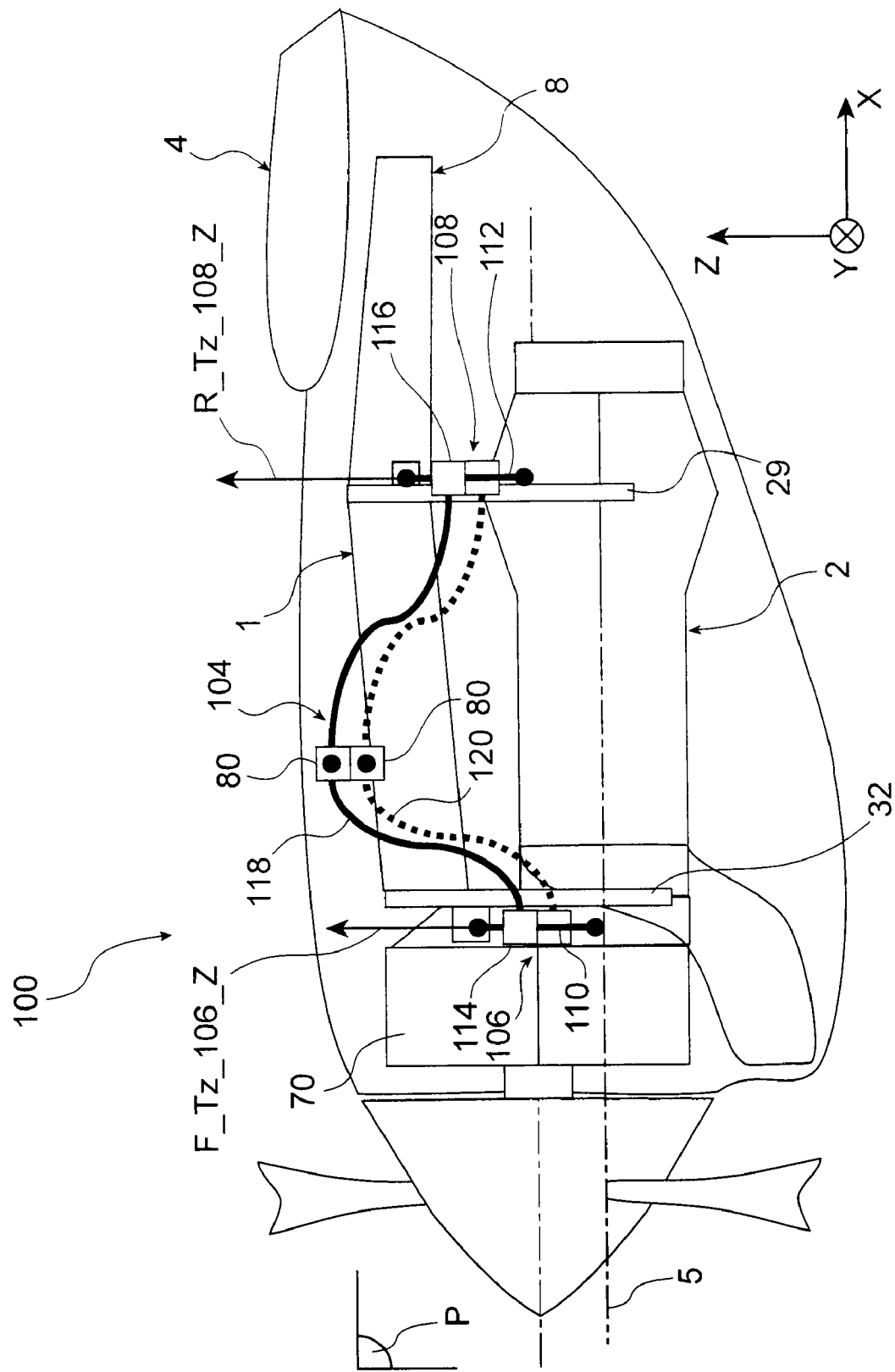

With reference to FIG. 4, it is possible to see diagramatically hydraulic system 104 forming an integral part of the fasteners and dedicated to the transfer, from turboprop engine 2 to rigid structure 8, of the efforts being exerted in direction Z or, in other words, being exerted with degree of freedom Tz.

System 104 comprises two hydraulic jacks 106, 108, preferably spaced longitudinally one from the other. Jacks 106, 108 have, respectively, a piston 110, 112, attached in fixed fashion to the turboprop engine, and more specifically on to main transmission 70 in respect of piston 110, and also have a slide cylinder 114, 116 housing piston 110, 112, and allowing it to slide, where this cylinder is attached in fixed fashion to the rigid structure, and more specifically respectively on to forward frame 32 and rear frame 29.

For each of the jacks 106, 108, piston 110, 112 demarcates an upper chamber and a lower chamber, where both upper chambers are connected hydraulically to one another by means of a hydraulic line 118, and where both lower chambers are connected hydraulically to one another by means of another hydraulic line 120.

The orientation of pistons 110, 112 and their slide direction within the associated cylinder are aligned with direction Z, such that each is capable of transferring efforts in this same direction.

The two efforts represented in FIG. 4 thus correspond to the efforts transmitted by hydraulic system 104 to rigid structure 8, and are called F_Tz_106_Z and R_Tz_108_Z.

Here again, a hydraulic dampening device 80 is fitted to each of the lines 118, 120, for the same purposes as those indicated above.

Figure 5:
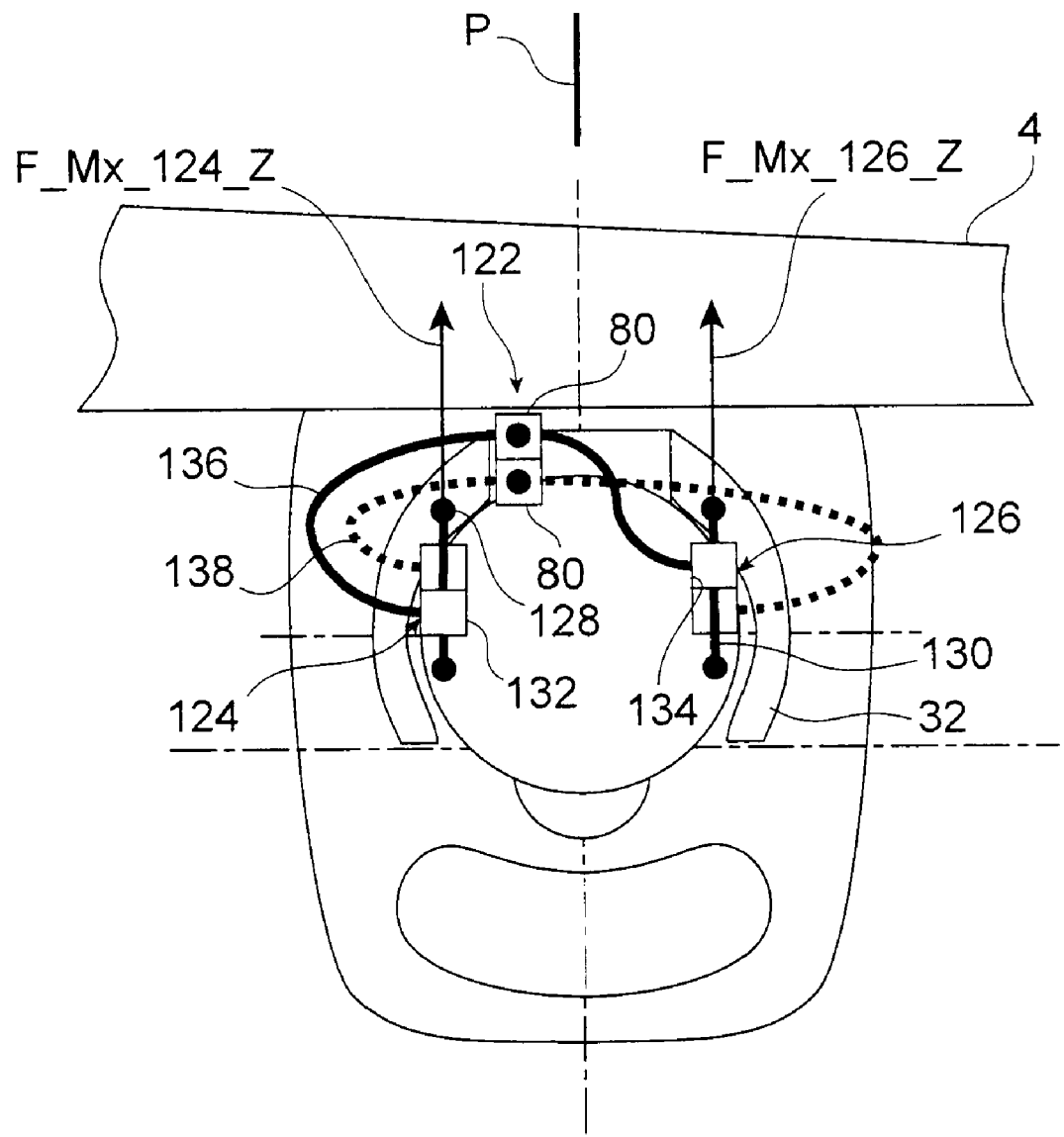

With reference to FIG. 5, it is possible to see diagramatically hydraulic system 122 forming an integral part of the abovementioned fasteners and dedicated to the transfer, from turboprop engine 2 to rigid structure 8, of the efforts being exerted according to axis of rotation X or, in other words, being exerted with degree of freedom Mx.

System 122 comprises two hydraulic jacks 124, 126, preferably distributed symmetrically relative to vertical plane P. Jacks 124, 126 have, respectively, a piston 128, 130 attached in fixed fashion on to forward frame 32 in the case of one, and to the jet engine in the case of the other, and also have a slide cylinder 132, 134 housing piston 128, 130, and allowing it to slide, where this cylinder is attached in fixed fashion to the turboprop engine in the case of one, and more specifically on to main transmission 70, and on to frame 32 in the case of the other.

For each of the jacks 124, 126, piston 128, 130 demarcates an upper chamber and a lower chamber, where these chambers are connected hydraulically in opposition, by means of two hydraulic lines 136, 138. As can be seen in FIG. 5, line 136 connects the upper chamber of jack 124 and the lower chamber of jack 126, while line 138 connects the lower chamber of jack 124 and the upper chamber of jack 126.

The orientation of pistons 128, 130 and their slide direction within the associated cylinder are aligned with direction Z, such that each is capable of transferring efforts in this same direction.

The two efforts represented in FIG. 5 thus correspond to the efforts transmitted by hydraulic system 122 to rigid structure 8, and are called F_Mx_124_Z and F_Mx_126_Z.

Jacks 124, 126, which produce such efforts and which are interconnected hydraulically in the manner set out above, thus passively oppose torque Mx, whatever the intensity and direction of this torque.

Here too, a hydraulic dampening device 80 is fitted to each of the lines 136, 138, for the same purposes as those indicated above.

Figure 6:
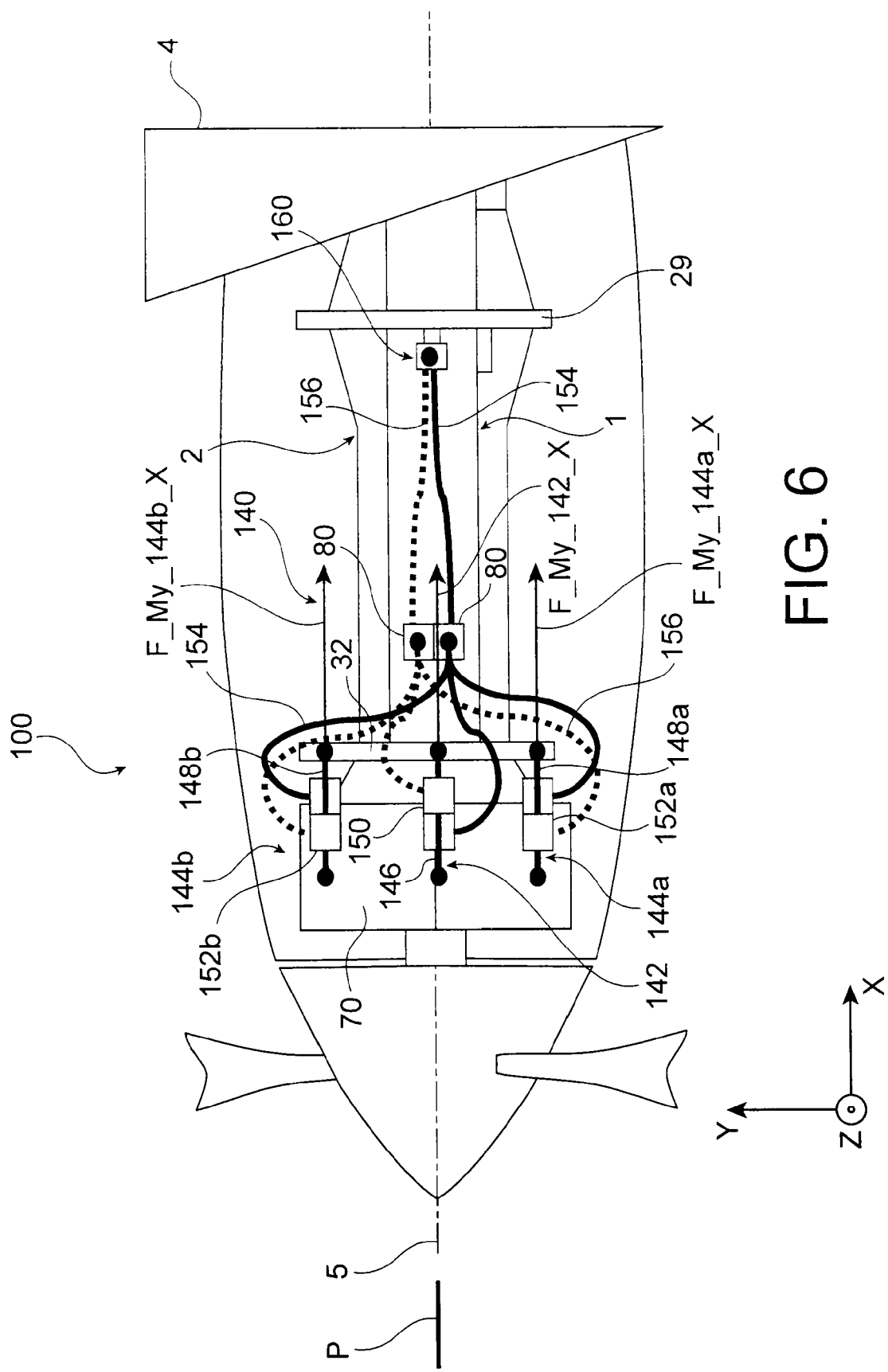
Figure 7:
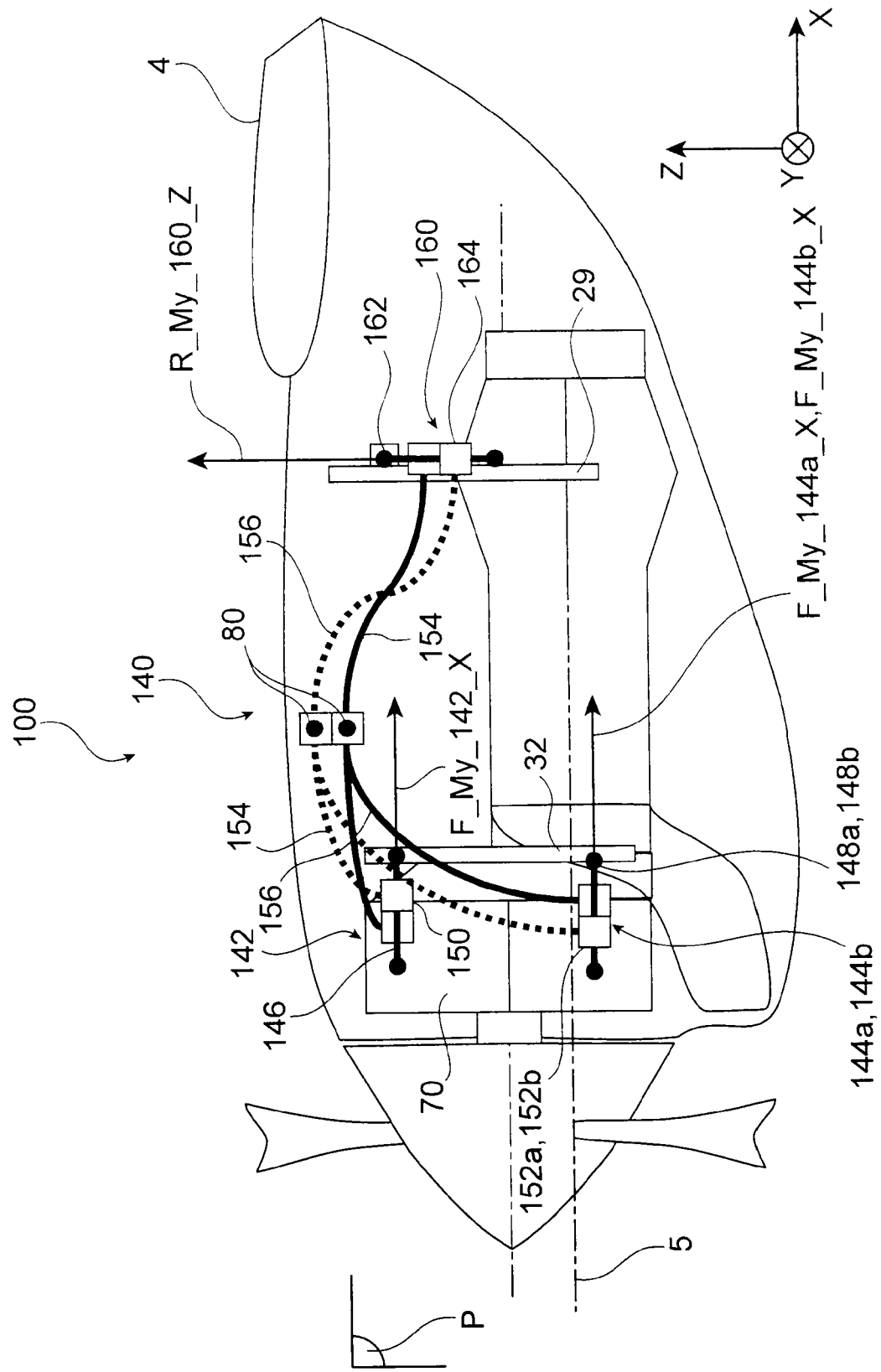

With reference to FIGS. 6 and 7, it is possible to see diagramatically hydraulic system 140 forming an integral part of the abovementioned fasteners and dedicated to the transfer, from turboprop engine 2 to rigid structure 8, of the efforts being exerted according to axis of rotation Y or, in other words, being exerted with degree of freedom My.

With reference firstly to FIG. 6, system 140 comprises three hydraulic jacks 142, 144a, 144b, where the latter two are preferably distributed symmetrically relative to vertical plane P, and jack 142 is traversed by this same plane. In addition, jack 142 is located higher than the two symmetrical jacks 144a, 144b, as is shown by FIG. 7.

Jacks 144a, 144b have respectively a piston 148a, 148b attached in fixed fashion to forward frame 32, at the lower ends of the latter, and also have a slide cylinder 152a, 152b housing piston 148a, 148b and allowing it to slide, where this cylinder is attached in fixed fashion on to the turboprop engine, and more specifically on to main transmission 70.

In addition, forward upper jack 142 has a piston 146 attached in fixed fashion on to the turboprop engine, and more specifically on to main transmission 70, and also a slide cylinder 150 housing piston 146 and allowing it to slide, where this cylinder is attached in fixed fashion on to forward frame 32, in the area of an upper end of the latter.

For each of jacks 142, 144a, 144b, piston 146, 148a, 148b demarcates a forward chamber and a rear chamber, where both forward chambers of jacks 144a, 144b and the rear chamber of jack 142 are connected hydraulically to one another by means of a hydraulic line or system 154, and both rear chambers of jacks 144a, 144b and the forward chamber of jack 142 are connected hydraulically to one another by means of another hydraulic line or system 156.

The orientation of pistons 146, 148a, 148b and their slide direction within the associated cylinder are aligned with direction X, such that each is capable of transferring efforts in this same direction.

The three efforts represented in FIG. 6 thus correspond to the efforts transmitted by hydraulic system 140 to rigid structure 8, and are called F_My_142_X, F_My_144a_X, and F_My_144a_X.

Here too, a hydraulic dampening device 80 is fitted to each of the lines 154, 156, for the same purposes as those indicated above.

In FIG. 7, it is possible to see that system 140 also comprises a rear hydraulic jack 160, with a piston 162 attached in fixed fashion on to rear frame 29, and also has a slide cylinder 164 housing piston 162 and allowing it to slide, where this cylinder is attached in fixed fashion on to the turboprop engine.

Jack 160 demarcates an upper chamber and a lower chamber, where the upper chamber is connected to hydraulic line 154, thus taking the form of four segments each originating in the dampening device, and where the lower chamber is connected to hydraulic line 156, also taking the form of four segments each originating from dampening device 80 positioned on this line.

The orientation of piston 162 and its slide direction within the associated cylinder are aligned with direction Z, such that it is capable of transferring efforts in this same direction.

The effort represented in FIG. 7 thus corresponds to another effort transmitted by hydraulic system 140 to rigid structure 8, and is called R_My_160_Z.

Jacks 142, 144a, 144b, 160, which produce such efforts and which are interconnected hydraulically in the manner set out above, thus passively oppose torque My, whatever the intensity and direction of this torque.

Figure 8:
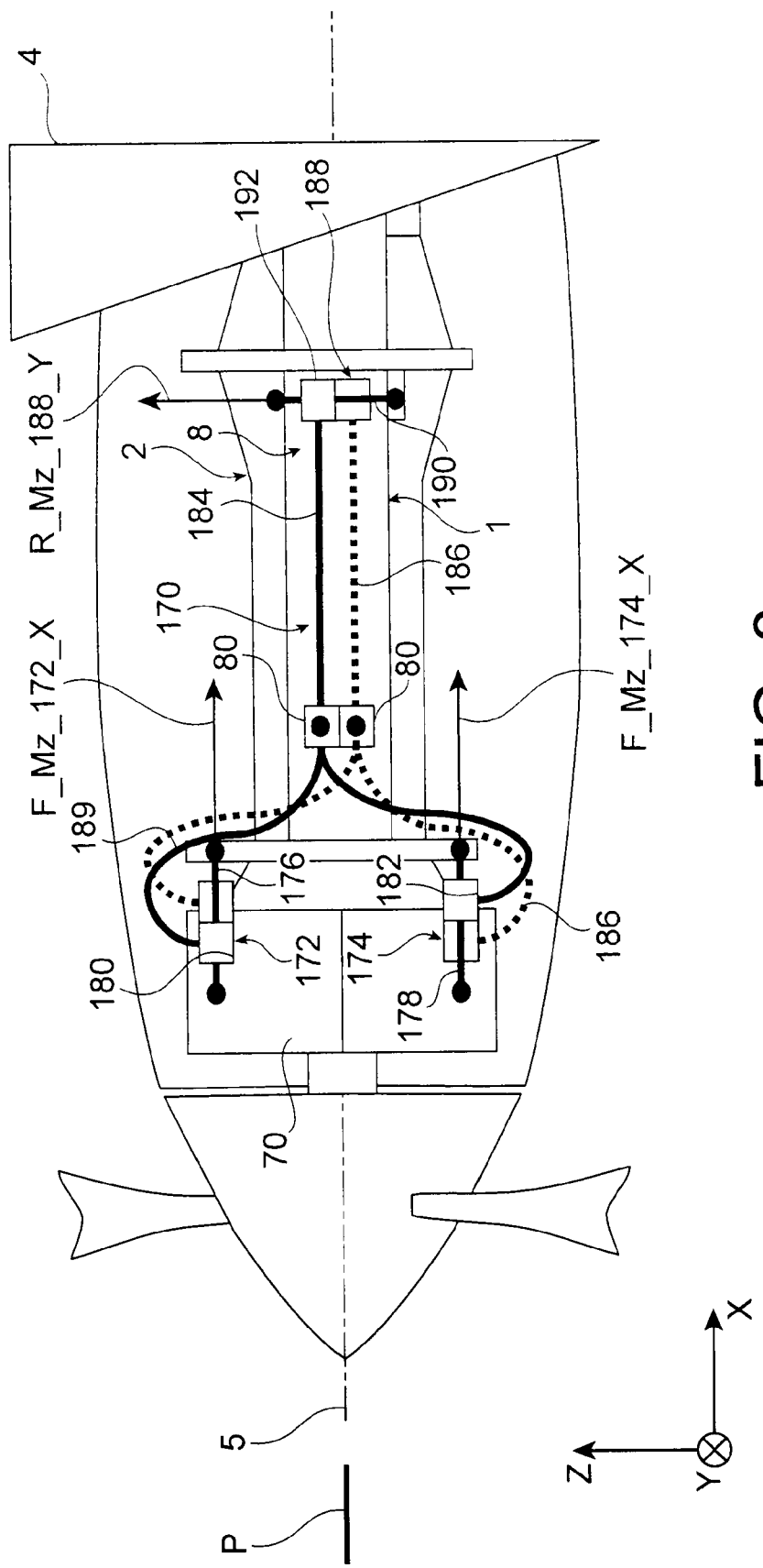

Lastly, with reference to FIG. 8, it is possible to see diagramatically hydraulic system 170 forming an integral part of the abovementioned fasteners and dedicated to the transfer, from turboprop engine 2 to rigid structure 8, of the efforts being exerted according to axis of rotation Z or, in other words, being exerted with degree of freedom Mz.

System 170 firstly comprises two forward jacks 172, 174, preferably distributed symmetrically relative to vertical plane P, which is a symmetry plane of engine unit 100. Jacks 172, 174 have, respectively, a piston 176, 178 attached in fixed fashion on to forward frame 32 in the case of one, and to the jet engine in the case of the other, and also have a slide cylinder 180, 182 housing piston 176, 178, and allowing it to slide, where this cylinder is attached in fixed fashion to the turboprop engine 2 in the case of one, in the area of its main transmission 70, and on to frame 32 in the case of the other.

For each of the jacks 172, 174, piston 176, 178 demarcates a forward chamber and a rear chamber, where these chambers are connected hydraulically in opposition, by means of two hydraulic lines 184, 186. As can be seen in FIG. 8, line 184 connects the forward chamber of jack 172 and the rear chamber of jack 174, while line 186 connects the rear chamber of jack 172 and the forward chamber of jack 174.

The orientation of pistons 172, 174 and their slide direction within the associated cylinder are aligned with direction X, such that each is capable of transferring efforts in this same direction.

The two efforts represented in FIG. 8 thus correspond to the efforts transmitted by hydraulic system 170 to rigid structure 8, and are called F_Mz_172_X and F_Mz_174_X.

Here too, a hydraulic dampening device 80 is fitted to each of the lines 184, 186, for the same purposes as those indicated above.

It is possible to see that system 170 also comprises a rear hydraulic jack 188, with a piston 190 attached in fixed fashion on to rear frame 29, and also has a slide cylinder 192 housing piston 190 and allowing it to slide, where this cylinder is attached in fixed fashion on to the turboprop engine.

Jack 188 demarcates a right-hand chamber and a left-hand chamber, where the right-hand chamber is connected to jacks 172, 174 by means of hydraulic line 184, thus taking the form of three segments each originating from the dampening device, and where the left-hand chamber is connected to jacks 172, 174 by means of hydraulic line 186, also taking the form of three segments each originating from the dampening device.

The orientation of piston 190 and its slide direction within the associated cylinder are aligned with direction Y, such that it is capable of transferring efforts in this same direction. The effort represented in FIG. 8 thus corresponds to another effort transmitted by hydraulic system 170 to rigid structure 8, and is called R_Mz_188_Y.

Jacks 172, 174, 188, which produce such efforts and which are interconnected hydraulically in the manner set out above, thus passively oppose torque Mz, whatever the intensity and direction of this torque.

Figure 9:
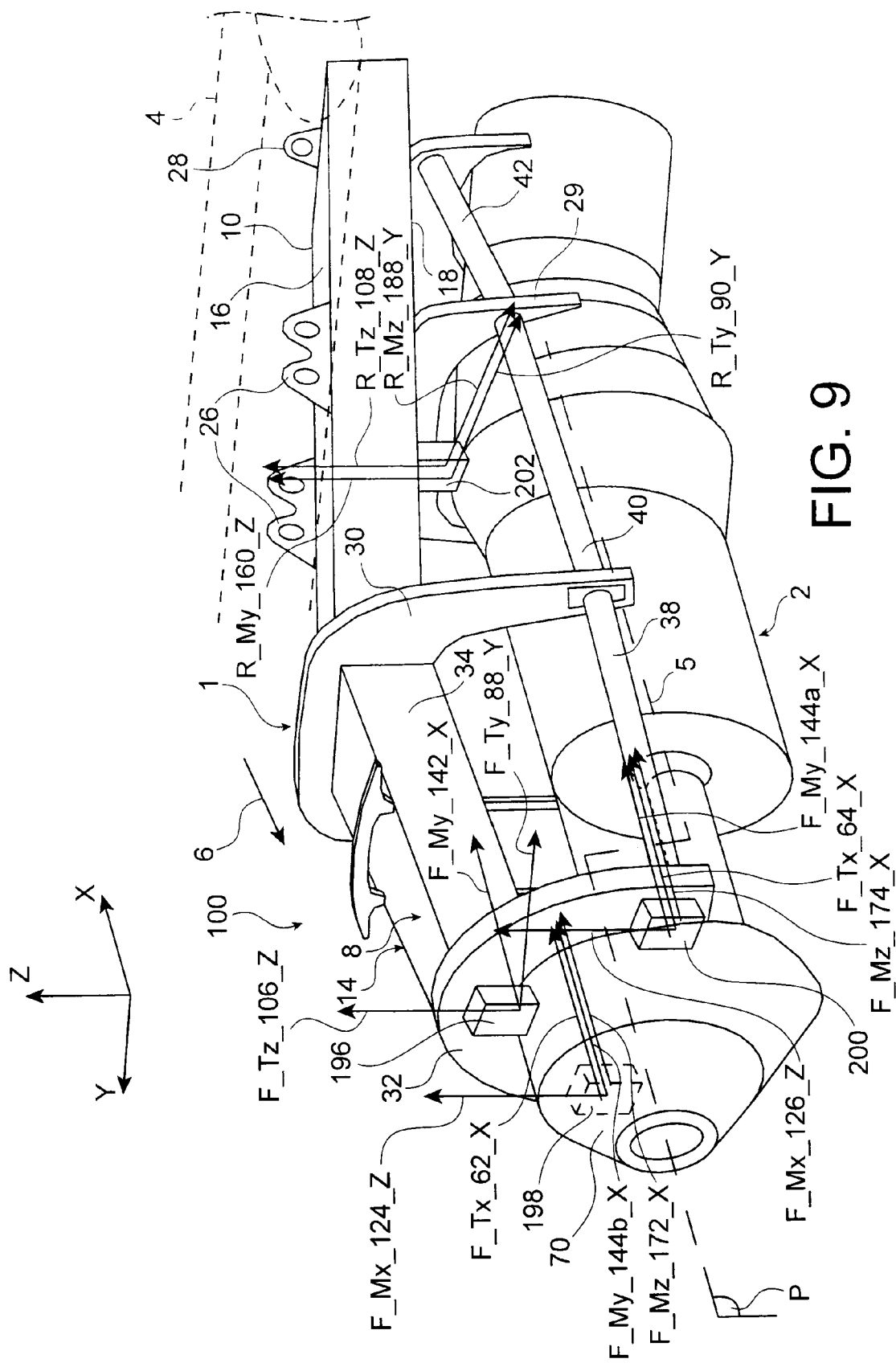
FIG. 9 represents a diagrammatic view summarising the efforts transmitted to the rigid structure by the hydraulic fasteners shown in FIGS. 2 to 8.

In FIG. 9 all the efforts exerted by the hydraulic jacks of the turboprop engine's fasteners are reproduced diagramatically; these efforts can, as shown in this figure, be concentrated at three points 196, 198, 200 on forward frame 32, and at a point 202 on rear frame 29 of the rigid structure, where points 196 and 202 are preferably traversed by plane P, and points 198, 200 positioned symmetrically relative to this same plane. Naturally, as this results from the foregoing, no other element than the hydraulic systems is used to provide the mounting of the turboprop engine on the rigid structure.

As mentioned above, the hydraulic jacks are dimensioned so as to obtain the desired distribution of the efforts between forward frame 32 and rear frame 29, for example 80% of the efforts passing through the forward frame, and 20% through the rear frame.

Naturally, various modifications can be made by the skilled man in the art to the invention which has just been described, solely as non-restrictive examples.

The invention claimed is:

1. An engine unit for an aircraft including a turboprop engine together with a device for mounting the turboprop engine on a wing surface of the aircraft, the mounting device comprising:
   a rigid structure; and
   fasteners that fasten the turboprop engine on to the rigid structure,
   wherein the fasteners comprise six mutually independent hydraulic systems, each one exclusively dedicated to transfer, to the rigid structure, forces associated respectively with one of six degrees of freedom of movement associated with the turboprop engine such that each hydraulic system is associated only with a single degree of freedom,
   wherein each hydraulic system comprises at least one hydraulic jack with a piston attached to one of either the turboprop engine or the rigid structure of the mounting device, together with a cylinder housing the piston and attached to the other of the turboprop engine or the rigid structure of the mounting device such that each of said hydraulic system only reacts to forces from movements of the turboprop engine relative to said rigid structure.

2. An engine unit according to claim 1, wherein at least one of the six hydraulic systems comprises at least two jacks connected hydraulically and each including a piston attached to one of the turboprop engine or the rigid structure of the mounting device, together with a cylinder housing the piston and attached to the other of the turboprop engine or the rigid structure of the mounting device.

3. An engine unit according to claim 2, wherein at least one hydraulic system of the six hydraulic systems comprises a dampening device coupled to the hydraulic jack of said at least one hydraulic system and configured to dampen vibrations of the turboprop engine.

4. An engine unit according to claim 3, wherein the dampening device comprises a fluid tank in fluid communication with said hydraulic jack, said tank including a body able to be compressed by the pressure of the fluid.

5. An engine unit according to claim 4, wherein the body is made of rubber.

6. An engine unit according to claim 5, wherein the body has no rigid mechanical link with the fluid tank.

7. An engine unit according to claim 4, wherein the body is a ball inserted in the fluid tank.

8. An engine unit according to claim 1, wherein the rigid structure comprises transverse frames, and each of the hydraulic jacks is connected to one of the transverse frames.

9. An engine unit according to claim 8, wherein only two transverse frames bear the hydraulic jacks.

10. An engine unit according to claim 1, wherein no element other than said six independent hydraulic systems participates in interfacing between the turboprop engine and the rigid structure.

11. An engine unit according to claim 8, wherein the rigid structure comprises two transverse frames, wherein each of the hydraulic jacks is connected to one of said two transverse frames, and wherein said six hydraulic systems are not connected to any other part of said rigid structure.

12. An engine unit according to claim 1, wherein the rigid structure comprises transverse frames, wherein each of the hydraulic jacks is connected to one of said transverse frames, and wherein said six hydraulic systems are not connected to any other part of said rigid structure.

13. An aircraft comprising:
   at least one engine unit according to claim 1.

* * * * *